United States Patent [19]

Messere

[11] Patent Number: 4,761,163

[45] Date of Patent: Aug. 2, 1988

[54] METHOD FOR MAKING QUICK AGEING ABRASIVE SLURRIES FOR THE CONSTRUCTION OF GRINDING WHEELS, AND THE ABRASIVE SLURRIES MADE THEREBY

[76] Inventor: Ida Messere, Strada Adriatica, 47/p -- 70100, Bar, Italy

[21] Appl. No.: 96,616

[22] Filed: Sep. 14, 1987

[51] Int. Cl.⁴ .............................................. B24D 3/00
[52] U.S. Cl. ...................................... 51/293; 51/298; 51/307
[58] Field of Search ....................... 51/293, 298, 307

[56] References Cited

U.S. PATENT DOCUMENTS

| | | | |
|---|---|---|---|
| 4,251,408 | 2/1981 | Hesse et al. | 51/295 |
| 4,253,850 | 3/1981 | Rue et al. | 51/293 |
| 4,544,376 | 10/1985 | Duran | 51/293 |

*Primary Examiner*—Paul Lieberman
*Assistant Examiner*—Willie J. Thompson
*Attorney, Agent, or Firm*—Bucknam and Archer

[57] ABSTRACT

The invention relates to a method for making quick ageing abrasive slurries particularly designed for the construction of grinding wheels, comprising the steps of preparing a slurry starting from magnesium carbonate, magnesium sulphate, abrasive materials and inert fillers, adding a phenolic resin, kneading to obtain a homogeneous mass, filling the slurry in forming molds and carrying out an ageing step, by cyclically heating the slurry with set increasing temperatures, and a subsequent cooling to the environment temperature.

7 Claims, No Drawings

METHOD FOR MAKING QUICK AGEING ABRASIVE SLURRIES FOR THE CONSTRUCTION OF GRINDING WHEELS, AND THE ABRASIVE SLURRIES MADE THEREBY

BACKGROUND OF THE INVENTION

The present invention relates to a method for making quick ageing abrasive slurries, particularly designed for grinding wheels, as well as to the abrasive material made thereby.

As is known, the most common abrasive materials are generally made of a magnesium carbonate compound, which is mixed with the abrasive material proper, generally consisting of silicon carbide and possible inert fillers.

The thus made slurry, upon forming in suitable molds, is to be subjected to an ageing period.

More specifically, the ageing operation, with conventional magnesium carbonate binding agents, requires a time period which is not less than thirty days.

As is known this represents a great drawback since a high ageing time causes a remarkable increase of the making cost.

Moreover, the conventional abrasive materials have uneven wear properties as well as abrasive properties which are not completely satisfactory.

SUMMARY OF THE INVENTION

Accordingly, the main object of the present invention is to overcome the above mentioned drawbacks by providing a method for making abrasive slurries which affords the possibility of omitting the ageing step, by reducing it to a few hour cycle, with the advantages deriving therefrom.

Another object of the present invention is to provide a method for making abrasive slurries which affords the possibility of making abrasive materials with even wear properties.

Yet another object of the present invention is to provide a method for making abrasive slurries which may be prepared starting from easily available materials and elements and which, moreover, has a comparatively low cost.

SUMMARY OF THE INVENTION

According to one aspect of the present invention the above mentioned objects, as well as yet other objects, which will become more apparent thereinafter, are achieved by a method for making quick ageing abrasive slurries, particularly designed for grinding wheels, characterized in that it comprises the steps of making a slurry of magnesium carbonate, magnesium chloride, magnesium sulphate and abrasive materials and inert fillers, adding a phenolic resin, mixing so as to provide a homogeneous mass, introducing the slurry into forming molds and then subjecting the filled molds to an ageing operation by heating them to preset increasing temperatures, and finally slowly cooling the molds to the environmental temperature.

Further characteristics and advantages of the invention will become more apparent thereinafter from the following detailed disclosure of a preferred embodiment of the subject method for making quick ageing abrasive slurries as well as of the abrasive slurries made thereby.

DESCRIPTION OF THE PREFERRED EMBODIMENTS

More specifically, the method according to the present invention essentially consists of adding, to the conventional magnesium carbonate cement, which forms the binding material, a phenolic resin, partially in solid form and partially in liquid form, which has been found to be effective to reduce the ageing time.

For carrying out the method according to the present invention, there is formed a slurry of magnesium carbonate, a magnesium chloride solution, magnesium sulphate and abrasive materials, as well as inert fillers; then the phenolic resin is added to the thus formed slurry in an amount varying from 14 to 22% by weight, and the slurry is mixed so as to make a homogeneous mixture having the desired viscosity.

The thus made slurry is then filled in forming molds and, then, it is subjected to an ageing step which is made by a heating cycle in suitably heated and ventilated ovens.

The heating cycle which has been found to be the most suitable provides for holding the slurry at 60° C. for two hours, then at 90° C. for one hour, at 130° C. for three hours and at 150° C. for four hours.

At the end of the heating step, the slurry is slowly cooled to the environmantal temperature.

It has been found that the mentioned heating or baking step causes the phenolic resin to suitably operate so as to provide the abrasive slurries with good wear and abrasive properties.

The slurry may be made by changing the amounts of the component elements, depending on the use of the grinding wheel to be made.

For example, in order to make polishing abrasive materials, it is preferred a slurry having the following formulation:

| | |
|---|---|
| Magnesite (magnesium oxide MgO) | 25% |
| Magnesium chloride (MgCl$_2$) in solution at 31° BAUME' | 26% |
| Magnesium sulphate (MgSO$_4$) | 2% |
| Phenolic resin in powder form | 6% |
| Phenolic resin in liquid form | 1% |
| Silicon carbide 16-46 (SiC) | 30% |
| Quartz (granulated silica) | 5% |
| Corundum | 5% |

As a slurry for finishing grinding wheels is to be prepared, the following formulation may be prepared:

| | |
|---|---|
| Magnesite | 25% |
| Magnesium chloride in solution 31° BAUME' | 26% |
| Magnesium sulphate | 2% |
| Phenolic resin in powder form (Novolac) | 8% |
| Phenolic resin in liquid form (Novolac) | 1% |
| Silicon carbide 60-220 | 23% |
| Perlite (foamed silica) | 5% |
| Quartz (granulated silica) | 5% |
| Corundum (Al$_2$O$_3$) | 5% |

As a slurry is to be made for lapping wheels, the most suitable formulation will be the following:

| | |
|---|---|
| Magnesite | 27% |
| Magnesium chloride in solution at 31 BAUME' | 29% |
| Magnesium sulphate | 2% |
| Phenolic resin in powder form | 12% |
| Silicon carbide 240-1200 | 22% |

| -continued | |
|---|---|
| Aluminium oxide (Al$_2$O$_3$) | 5% |
| Corundum (Al$_2$O$_3$) | 3% |

From the above disclosure it should be apparent that the use of phenolic resin in the main portion affords the possibility of modifing the ageing characteristics of the abrasive slurry, since it drastically reduces the time required for ageing the magnesite binding material, bringing it to a complete ageing cycle of the order of few hours.

Moreover the phenolic resin, in addition to practically eliminating the ageing step, affords the possibility of making an abrasive product having improved characteristics which will be further improved by the oven heating step which has been previously disclosed.

While the invention has been disclosed with reference to preferred embodiments thereof, it should be apparent that it is susceptible to several modifications and variations all of which come within the invention scope.

Moreover the disclosed component elements may be replaced by other technically equivalent elements.

In practicing the invention, the amounts of the used materials may be changed within a broad range, without departing from the scope and spirit of the invention.

I claim:

1. A method for making quick ageing abrasive slurries, particularly designed for grinding wheels, characterized in that it comprises the steps of making a slurry of magnesium carbonate, magnesium chloride, magnesium sulphate and abrasive materials and inert fillers, adding a phenolic resin, mixing so as to provide a homogeneous mass, introducing the slurry into forming molds and then subjecting the filled molds to an ageing operation by heating them to preset increasing temperatures, and finally slowly cooling the molds to the environmental temperature.

2. A method according to claim 1, characterized in that said phenolic resin is partially used in the powder form and partially in the liquid form.

3. A method according to claim 1, characterized in that said increasing temperature heating cycle provided for heating for two hours at 60° C., followed by a heating for one hour at 90° C., for two hours at 110° C., for three hours at 130° C., and for four hours at 150° C.

4. A method according to claim 1, characterized in that said heating cycle is carried out in heated and ventilated ovens.

5. A slurry for making quick ageing abrasive materials, characterized in that it comprises 25% of magnesite, 26% of magnesium chloride in solution at 31° Baumé with water, 2% of magnesium sulphate, powder phenolic resin 14%, liquid phenolic resin 1%, silicon carbide 16-46 30%, quartz 5%, corundum 5%.

6. A slurry for making quick ageing abrasive materials, particularly for finishing works and characterized in that it comprises 26% magnesite, magnesium chloride 9%, in solution at 31° Baumé with water, 2% magnesium sulphate, powder phenolic resin 8%, liquid phenolic resin 1%, 60-220 silicon carbide 23%, perlite 5%, quartz 5% and corundum 5%.

7. A slurry for making quick ageing abrasive materials, particularly for lapping works, characterized in that it comprises magnesite 27%, magnesium chloride in water solution at 31° Baumé 29%, magnesium sulphate 2%, powder phenolic resin 12%, 240-1200 silicon carbide 22%, aluminium oxide 5% and corundum 3%.

* * * * *